3,014,919
DITHIOCARBAMATE SALTS OF DODECAHYDRO-CARBAZOLE
Hans Dressler, Pitcairn, and Melvin E. Baum, Pittsburgh, Pa., assignors to Koppers Company, Inc., a corporation of Delaware
No Drawing. Filed June 16, 1959, Ser. No. 820,616
4 Claims. (Cl. 260—315)

This invention relates to salts of dithiocarbamates. In one specific aspect, it relates to the metal salts of N,N-(perhydro-o,o'-biphenylene) dithiocarbamate.

Dodecahydrocarbazole, a hydrogenation product of carbazole, is a promising chemical intermediate because of its solvent solubility, relatively low melting point and the basicity of its amino nitrogen. Known derivatives of this interesting compound are relatively few, possibly because of the expense heretofore involved in its preparation. Recent refinements in the hydrogenation of carbazole (which occurs in coal tar to the extent of 2–3 percent in the anthracene fraction thereof) have made dodecahydrocarbazole readily available.

Quite surprisingly, we have found a new class of chemical compounds derived from dodecahydrocarbazole which, because of their thermal stability and chemical properties, are remarkably effective as accelerators for the vulcanization of rubber and for other purposes.

It is therefore an object of the present invention to provide a new class of dithiocarbamate salts which are particularly useful in the art of rubber vulcanization and which, in addition, possess fungicidal activity.

In accordance with the invention, we have discovered chemical compounds of the formula:

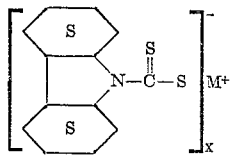

In the formula shown hereabove, M represents any metal and X has a value of 1–4, depending on the valence of the metal.

All of the compounds of the invention, when added in small amounts, e.g. 0.05 to 5%, to a conventional rubber mix, serve to accelerate the reaction between sulfur and rubber, although their activity varies somewhat with the choice of metal. For example, the N,N-(perhydro-o,o'-biphenylene) dithiocarbamates of the heavy metals such as lead and bismuth appear to be more active than those of sodium, potassium, lithium, calcium, magnesium, strontium and barium. The zinc, copper, cadmium and iron salts show outstanding activity. Salts of amphoteric metals such as selenium and tellurium are also quite effective.

In addition to their use as rubber chemicals, the alkali and alkaline earth metal salts of the invention show promise as ore flotation agents. In this application they are used in amounts of, e.g. 1–5 percent by weight. As we have noted, the compounds of the invention exhibit fungicidal activity. They can be applied from a suitable solvent in amounts up to 7 p.p.m. to fruit trees to control rot without adversely affecting the trees.

The novel salts of the invention are obtained directly by reacting stoichiometric quantities of dodecahydrocarbazole and carbon disulfide in the presence of a salt of the metal desired, provided that the metal salt is soluble in the particular solvent chosen for the reaction. Suitable solvents for both the metal salt and the dodecahydrocarbazole include ethers, esters, aromatic hydrocarbons, alcohols, and the like. The pressure and temperature conditions suitable for the reaction vary widely. It is preferred to use atmospheric pressure and a temperature ranging between about 0 and 120° C., although any temperature up to the boiling point of the particular solvent chosen is effective. The product is recovered in a relatively pure form using conventional techniques, e.g. evaporation and recrystallization.

The salts of the invention can also be prepared indirectly from a novel intermediate, the dodecahydrocarbazole salt of N,N-(perhydro-o,o'-biphenylene) dithiocarbamate, which has the following formula:

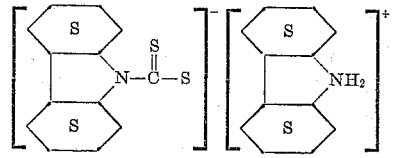

This novel compound is prepared by reacting dodecahydrocarbazole with carbon disulfide (in the absence of a metal salt) in the presence of a suitable solvent as described hereabove. After solvent removal and recrystallization, the novel dodecahydrocarbazole salt of N,N-(perhydro-o,o'-biphenylene) dithiocarbamate is obtained in a substantially quantitative yield as crystals melting at 184–191° C. The novel intermediate is converted to a metal salt by reacting it with a salt of the desired metal in a suitable solvent under temperature and pressure conditions hereinbefore described.

Suitable metal salts for both the direct and indirect preparation of the compounds of the invention include chlorides, bromides, acetates, sulfates, nitrates, and the like. The salts are used in the reaction in at least a stoichiometric quantity.

It is also possible, depending upon the activity of the particular metals involved, to convert by simple metathesis one metal salt into a different metal salt. For example, an alkali metal salt of N,N-(perhydro-o,o'-biphenylene) dithiocarbamate can be readily converted to the zinc salt in alcoholic solution by reacting the alkali metal salt with zinc acetate.

Our invention is further illustrated by the following examples:

*Example I*

A solution of 3.8 grams (0.05 mole) of carbon disulfide in 10 ml. of ether was added to 8.95 grams (0.05 mole) of dodecahydrocarbazole in 20 ml. of ether at 20° C. The reaction mixture was held at this temperature for 30 minutes in order to insure completion of the reaction. The solvent was evaporated to give 11.0 grams of a pale yellow residue of the crude dodecahydrocarbazole salt of N,N-(perhydro-o,o'-biphenylene) dithiocarbamate, M.P. 180–190° C. After recrystallization from 95 percent ethanol, a substantially quantitative yield of colorless crystals, M.P. 184–191° C., was obtained. The product was 96 percent pure by nitrogen analysis and 92 percent pure by sulfur analysis. Calculated for $C_{25}H_{42}N_2S_2$: N, 6.45; S, 14.75; Found: N, 6.2; S, 13.6.

*Example II*

17.6 grams of molten dodecahydrocarbazole (0.1 mole) was added to 100 ml. of 1 N sodium hydroxide (0.1 mole). The resulting mixture was stirred vigorously and 7.6 grams (0.1 mole) of carbon disulfide was added thereto. The mixture became hot and clear. After evaporization to dryness, the residue was taken up in alcohol, again evaporated to dryness and digested in 100 ml. of ether. Filtration gave 12.5 grams (45 percent yield) of crystalline product. After recrystallization from acetone relatively pure sodium N,N-(perhydro-o,o'-biphenylene) dithiocarbamate was obtained as faintly yellow needles melting at 110–115° C. Calculated for $C_{13}H_{20}NS_2Na$: Neutral equivalent, 277; Found: Neutral equivalent, 245.

The other alkali metal and alkaline earth metal salts of N,N-(perhydro-o,o'-biphenylene) dithiocarbamate are made as described hereabove by substituting the appropriate hydroxide or oxide for the sodium hydroxide.

*Example III*

To a solution of 1.40 grams (0.05 mole) of sodium N,N-(perhydro-o,o'-biphenylene) dithiocarbamate in 50 ml. of methanol was added a warm solution of 0.50 gram (0.025 mole) of cupric acetate monohydrate in 25 ml. of methanol. The mixture was warmed on the steam bath with occasional swirling for 15 minutes, cooled to 25° C. and filtered. The deep brown solid was dried for one hour at 110° C. to give 0.90 gram (64 percent yield) of the copper salt of the dithiocarbamate. Additional product could be obtained by concentration of the filtrate. Calculated for $C_{26}H_{40}N_2S_4Cu$: Cu, 11.1; Found: Cu, 10.4.

*Example IV*

To a solution of 1.40 grams (0.05 mole) of sodium N,N-(perhydro-o,o'-biphenylene) dithiocarbamate in 50 ml. of methanol was added a warm solution of 0.55 gram (0.25 mole) of zinc acetate dihydrate in 25 ml. of methanol. The mixture was warmed on the steam bath with occasional swirling for 15 minutes, cooled to 25° C. and filtered. The colorless solid thus obtained was dried for one hour at 110° C. to give 0.8 gram (57 percent yield) of the zinc salt of the dithiocarbamate. Additional product could be obtained by concentration of the filtrate. Calculated for $C_{26}H_{40}N_2S_4Zn$: Zn, 11.4; Found: Zn, 12.4±0.3.

We claim:

1. Chemical compounds of the formula:

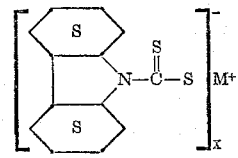

wherein M is a metal and X has a value of 1–4, depending on the valence of M.

2. Compounds of claim 1 wherein M is an alkali metal.
3. Compounds of claim 1 wherein M is zinc.
4. Compounds of claim 1 wherein M is copper.

References Cited in the file of this patent

UNITED STATES PATENTS

| | | |
|---|---|---|
| 2,144,704 | Muth | Jan. 24, 1939 |
| 2,323,651 | Dohrn et al. | July 6, 1943 |
| 2,340,650 | Dean | Feb. 1, 1944 |
| 2,572,845 | Himel et al. | Oct. 1, 1951 |
| 2,686,809 | Linch | Aug. 17, 1954 |
| 2,800,487 | Mark | July 23, 1957 |